Dec. 18, 1956   E. C. LAFFERTY ET AL   2,774,831
MULTIPLE SLIP RING JOINT
Filed Nov. 20, 1953   3 Sheets-Sheet 2
FIG-1b
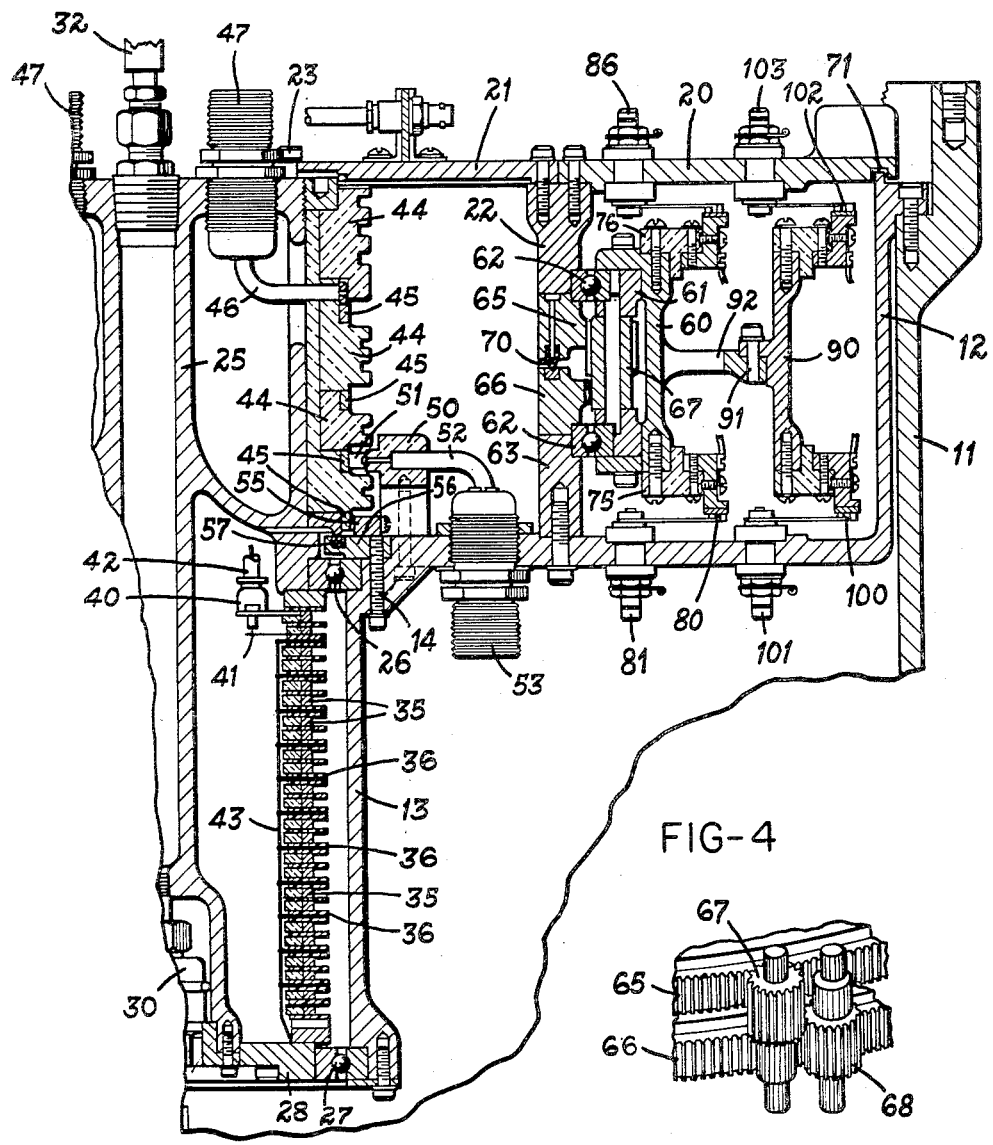
FIG-4
FIG-3
*INVENTORS*
EDWARD C. LAFFERTY &
BY WILLIAM O. YEAZELL
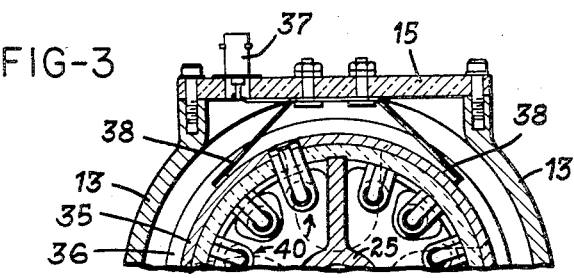
ATTORNEYS Dec. 18, 1956     E. C. LAFFERTY ET AL     2,774,831
MULTIPLE SLIP RING JOINT
Filed Nov. 20, 1953     3 Sheets-Sheet 3
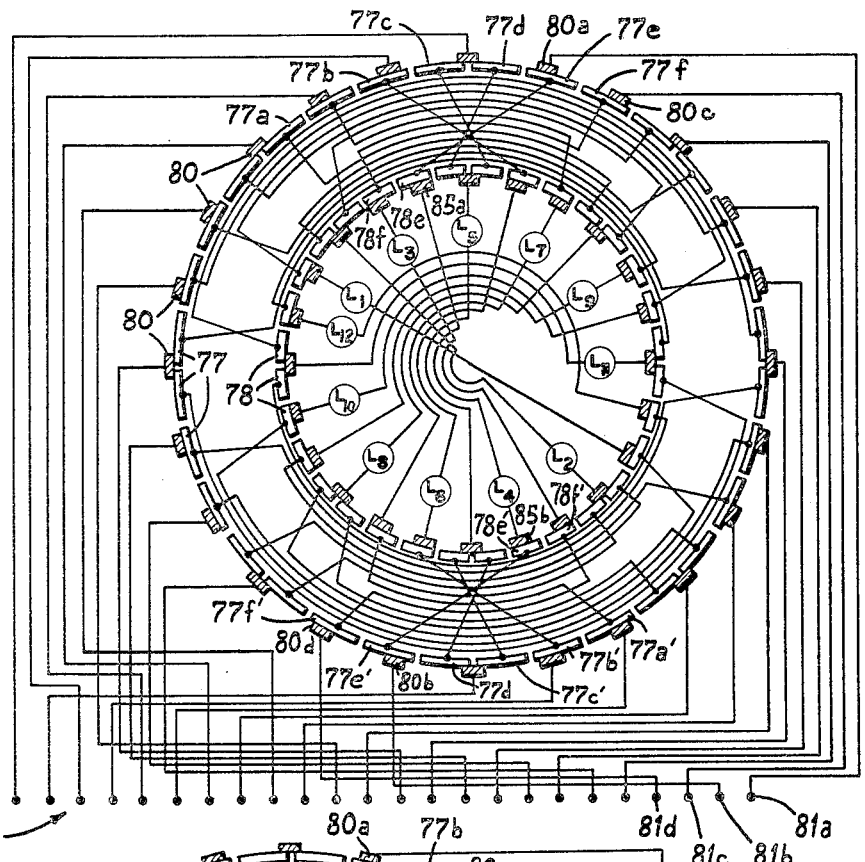
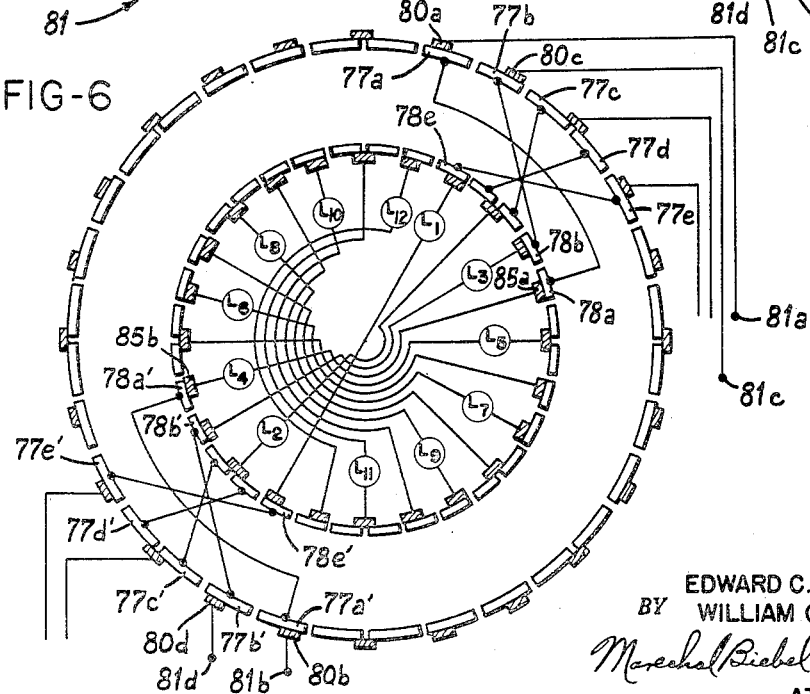
INVENTORS
EDWARD C. LAFFERTY &
BY   WILLIAM O. YEAZELL
ATTORNEYS United States Patent Office 2,774,831
Patented Dec. 18, 1956

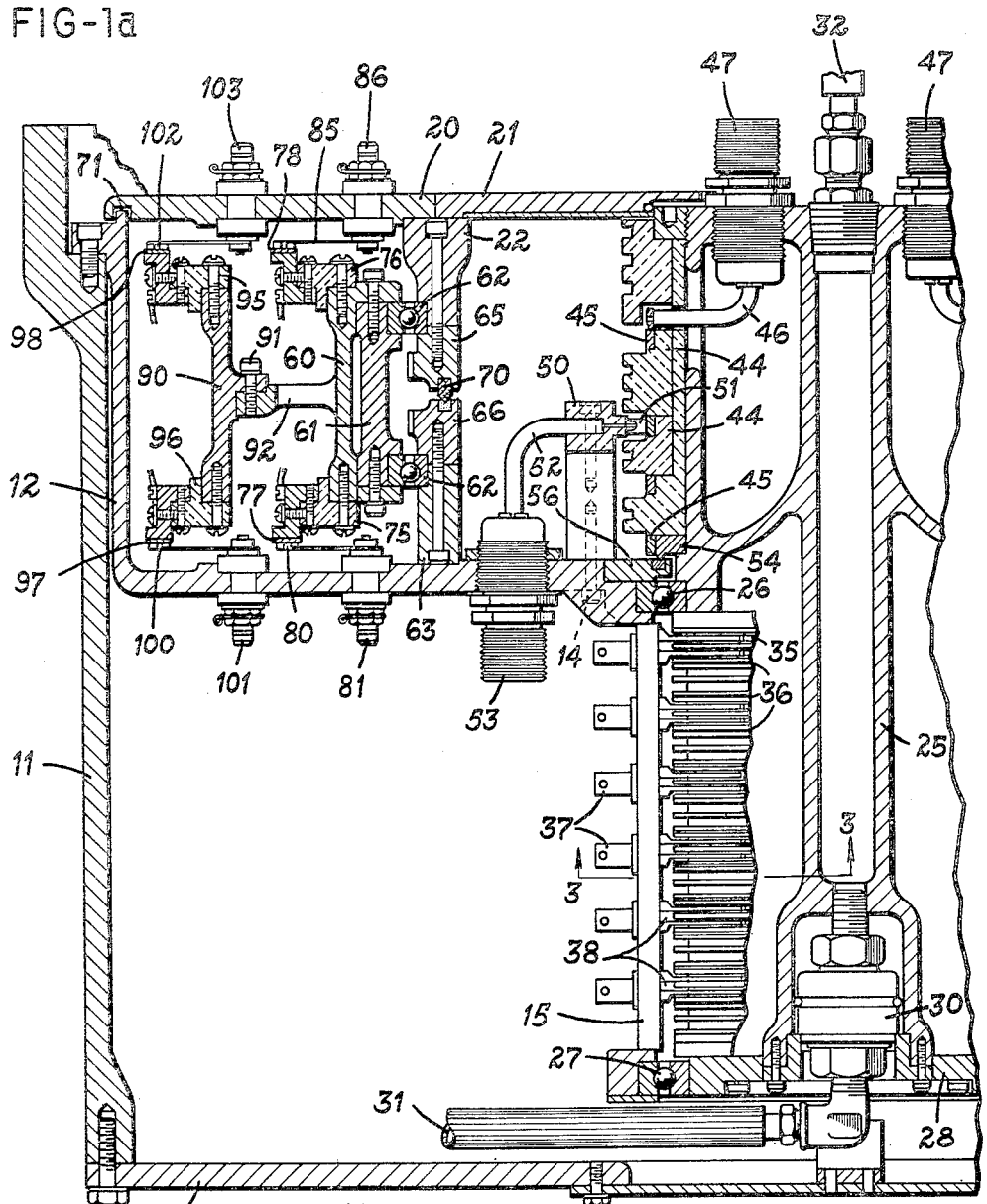

2,774,831

MULTIPLE SLIP RING JOINT

Edward C. Lafferty and William O. Yeazell, Springfield, Ohio, assignors, by mesne assignments, to Kelsey-Hayes Wheel Company, Detroit, Mich., a corporation of Delaware Application November 20, 1953, Serial No. 393,396

10 Claims. (Cl. 200—24)

This invention relates to a multiple slip ring joint for use in electrical equipment.

The invention has special relation to electrical equipment wherein it is desired to transfer a large number of electric circuits between a stationary base and a rotary member, and it is applicable in particular to installations such as radar tracking units wherein the circuits to be transferred include a substantial number of relatively high load or high power circuits requiring heavy shielding and also a large number of comparatively low load circuits having less severe shielding or insulation requirements.

A major general objective of the invention is to provide a multiple slip ring joint for use in electrical equipment of the type outlined above for transferring a large number of electrical circuits which is of relatively small and compact size while still offering adequate shielding for a large number of circuits having varying degrees of shielding requirements.

More specifically, it is a primary object of the present invention to provide a multiple slip ring joint which embodies a plurality of sets of brushes and segmental slip rings arranged for relative rotation at different speeds in such manner as to transfer large numbers of electric circuits between a stationary base and a rotary member through a joint unit of relatively small and compact proportions.

A further object of the invention is to provide a multiple slip ring joint which employs a plurality of stationary brushes on the base and also a plurality of rotating brushes rotating in cooperative differential speed relationship with a plurality of segmental contact rings in such manner as to maintain a continuous circuit between each pair of stationary and rotating brushes while progressively changing the ring segments which complete the circuits.

It is also an object of the invention to provide a multiple slip ring joint which employs brushes and segmental rings as outlined above for transferring low load circuits and which also incorporates a plurality of full rings and brushes mounted in concentric relationship within the segmental ring assembly for transferring high load circuits having relatively severe shielding requirements.

Additional objects and advantages of the invention will be apparent from the following description, the accompanying drawings and the appended claims.

In the drawings—

Figs. 1a and 1b form together a vertical section through a multiple slip ring joint constructed in accordance with the invention;

Fig. 2 is a fragmentary perspective view illustrating the arrangement of brushes and segmental rings in the construction of Figs. 1a and 1b;

Fig. 3 is a partial section on the line 3—3 of Fig. 1a;

Fig. 4 is a fragmentary perspective view illustrating the differential drive connection between the two parts of the joint assembly; and Figs. 5 and 6 are diagrammatic views illustrating the wiring and operation of the unit of Figs. 1a and 1b.

Referring to the drawings, which illustrate a preferred embodiment of the invention, the stationary base 10 is shown as including an upstanding outer wall 11 and an annular inner housing 12 of bowl shape bolted to the wall 11. Two spaced inner wall members 13 are bolted at 14 to the part 12 in depending relation therewith, and these wall members 13 cooperate with plates 15 of insulating material to form a lower stationary housing within the base.

The rotary member to which multiple circuits are to be transferred from the stationary base 10—15 includes a pair of annular upper plates 20 and 21 bolted to a spacer ring 22. The inner plate 21 is bolted at 23 to the upper end of a hollow core member 25 which is supported in guided rotatable relation with the base structure by means of the bearings 26 and 27 and its lower end plate 28. This core member 25 is also shown as carrying at its lower end a rotating pressure joint 30 adapted to be supplied at 31 with compressed air for transmission at 32 to the structure on the rotary member.

Within the housing formed by parts 13 and 15 are a plurality of continuous contact rings 35 alternating with appropriate insulating disks 36. The insulating plates 15 form supports for terminals 37 connected with brushes 38 in electrical contact with the rings 35 for connecting multiple circuits from the base to the rings, and Fig. 1b shows one of the terminal assemblies 40 for completing the circuit from the rings 35 to the rotary member. The shielded ground circuit 42 for the cable 41 is connected to an adjacent ring 35, and the other alternate rings 35 are shown as having a common connection 43 to ground.

The upper part of the base and rotary core 25 are shown as forming slip ring joints for high load or high power circuits requiring maximum shielding. The core member 25 carries a plurality of relatively large insulating sleeves 44 supporting spaced continuous contact rings 45 which may be connected as indicated at 46 to terminal assemblies 47 at the upper end of part 25, and a pair of these assemblies 47 may be connected in parallel with one or more of the rings 45 as shown where space limitations do not permit use of a single conductor and connector of adequately large size. The housing member 12 in turn carries brush holders 50 for brushes 51 which engage the rings 45 and are connected at 52 with terminal assemblies 53 extending through the part 12. In order to maintain the base and the rotary member at the same potential, the lowermost ring 45 is grounded to part 25 by a ring 54 and is grounded to the base by a brush unit 55 mounted on a ring 56 which is secured to base part 12, and ring 54 also forms with ring 56 a rotating seal 57 between parts 12 and 25.

Within the housing member 12 is a differentially rotatable carrier or housing 60 of generally cylindrical construction mounted for rotation by means of a spacer 61 and bearings 62 on the spacer ring 22 and a cooperating lower spacer ring 63 bolted to the part 12. This housing assembly is connected with the rotary member by a differential drive which includes a rotating differential gear 65 bolted to the spacer ring 22 and a stationary differential gear 66 bolted to the spacer ring 63. A rotating differential gear 65 engages the differential pinion 67 which is carried by the spacer 61 and meshes with the differential idler 68 which is also carried by spacer 61 and is in mesh with the stationary gear 66.

This gearing is such that when the rotary member including the plates 20 and 21 is driven by the drive (not shown) mounted thereon, the housing 60 will be driven in the same direction as the rotary member but at a speed ratio of 1 to 2 with respect to the rotary member, which will provide the same effect as if the base and rotary member were both driven at the same speed but in opposite directions with respect to the differential housing. The rotary seal 70 between the gears 65 and 66 also forms a ground connection maintaining the rotary member and the base at the same potential, and a labyrinth seal is provided at 71 between the parts 12 and 20.

The differential housing 60 carries a pair of segmental contact rings mounted thereon in axially spaced relation by means of insulating rings 75 and 76. The lower segmental ring is composed of a plurality of contact segments 77 arranged in angularly spaced relation, and the upper segmental contact ring comprises the same number of contact segments 78. The lower ring of contact segments 77 cooperates with a plurality of brushes 80 mounted on the stationary housing 12 by means of terminal assemblies 81 to which a corresponding plurality of low load circuits on the base structure may be connected.

The segments 77 and brush 80 are of such relative spacing and dimensions that as the housing 60 rotates, no segment will at any time be in contact with more than one brush, but each brush will short two adjacent segments while passing from one to the other. In order to facilitate this operation without arcing, the brushes are desirably of double construction as shown comprising a pair of angularly staggered leaf springs of different lengths each carrying a contact shoe 82. The upper ring of contact segments 78 cooperates with a similar plurality of double brushes 85 carried by terminal assemblies 86 mounted on the housing plate 20 and adapted for connection to a corresponding plurality of low load circuits on the rotary member. In order to prevent possible accumulation between adjacent contact segments of minute metallic particles such as may be produced by the repeated rubbing engagement of the shoes 82 with the segments, the contact segments in each ring are spaced radially beyond the periphery of their supporting insulating ring to provide air gaps through which any such particles will fall into the lower portion of the housing 12 without causing damage or malfunctioning of the equipment.

The individual segments 77 and 78 in each of the segmental rings have a predetermined relationship in number, angular dimensions and spacing with the two sets of brushes. With the required operating relationship outlined above, there must be more contact segments in each ring than there are brushes in the corresponding set in order to assure that no segment will ever be in contact with two brushes at the same time. The required number of segments is determined by the geometry of a given system depending on the number and spacing of the brushes, and Figs. 5 and 6 illustrate diagrammatically the operative relationship of one possible combination utilizing twenty-four brushes 80, and thirty-two segments 77.

The individual segments in each segmental ring may be of non-uniform angular dimensions and spacing, but it is generally more desirable to maintain uniform dimensions and spacings. In any event, the segments must be so arranged that each segment 77 in the lower ring has a corresponding segment 78 in the upper ring which is of the same angular positioning and dimensions but in the opposite direction from a selected datum point. The resulting corresponding pairs of segments in the two rings are directly connected by jumpers as shown in Fig. 5, and this arrangement has the effect of causing the jumpers in general to cross each other. It will of course be apparent that the showing in Figs. 5 and 6 is diagrammatic in that the upper row of segments 78 is shown as of smaller diameter than the row 77, whereas both rows are shown as of the same diameter in Figs. 1a and 1b. The relationship of the upper row of brushes 85 with the segments 78 is the same as described for the brushes 80 and segments 77 but is similarly shown diagrammatically in Figs. 5 and 6.

Figs. 5 and 6 illustrate the operation of the assembly as described above to maintain continuous circuits between each brush 80 and a corresponding brush 85. In Fig. 5, all of the brushes 85 are illustrated as connected in pairs with a corresponding plurality of loads L, and the stationary brushes 80 and 81 are similarly illustrated as cooperating in pairs with the brushes 85 to complete these load circuits. For purposes of illustration, certain of these parts are identified individually in Figs. 5 and 6, with the terminals 81a and 81b shown as connected in the same circuit, and similarly for the terminals 81c and 81d.

In Fig. 5, a circuit is shown as running from the terminal 81a and stationary brush 80a to a segment 77e in the lower segmental ring, and segment 77e is connected with a segment 78e in the upper ring shown as in engagement with one of the rotary brushes 85a which is connected in the load L4. The load L4 is also connected to another rotary brush 85b which is in engagement with a segment 78e' in the upper ring connected with segment 77e' in the lower ring, and this segment is in engagement with a stationary brush 80b connected with the terminal 81b. The circuit through the load L3 is shown as similarly including the terminal 81c, brush 80c, segment 77f, segment 78f, segment 78f', segment 77f', brush 80d and terminal 81d.

Fig. 6 represents the relative positions of the parts following 90° of rotation of the rotary member, which will cause 90° rotation of the brushes 85 and 45° rotation of the differential housing 60. The brush 80a is now in engagement with a segment 77a in the lower ring, but the corresponding upper segment 78a is in engagement with one of the rotary brushes 85a connected with load L4, and similarly the other rotary brush 85b connected with load L4 is in engagement with the segment 78a' which is connected with the segment 77a' in engagement with brush 80b. The load circuit L3 is similarly connected between brushes 80c and 80d by the segments 77b, 78b, 78b' and 77b'.

This same relationship between the stationary brushes and the load circuits on the rotary member is maintained throughout operation of the device, with the connections between the stationary and rotating brushes being progressively transferred from one set of contact segments to the next, and with each circuit being carried sometimes through one set of segments and jumpers and sometimes through two sets during the interval when the brushes are moving from one segment to the next. The same relationship will be maintained with other symmetrical connections between the rotary brushes such, for example, as an arrangement wherein the several load circuits are connected between directly adjacent brushes, provided the corresponding connections to the stationary brushes are similarly arranged. Similarly, the rotary brushes do not have to be used in pairs, since adjacent brushes may be connected in parallel where the current carrying capacity exceeds the allowable value for one brush, and also a plurality of rotary brushes can be used to carry the input circuits to a corresponding plurality of loads on the rotary member which are in turn connected with a common ground return circuit through a single rotating brush.

The invention has been described thus far in connection with single rings of rotating and stationary brushes, but it is especially applicable to use with a plurality of concentric rings, which offers outstanding advantages from the standpoint of providing for a great number of circuits in a unit of small size and compact proportions. Thus Figs. 1a and 1b show the housing 60 as carrying a similar outer housing member 90 mounted thereon as by bolts 91 on ribs 92 projecting from housing 60. The housing member 90 carries a pair of insulating rings 95 and 96 for supporting lower and upper rings of contact segments 97 and 98, similar to the segments 77 and 78. The lower ring of contact segments 97 cooperates with a ring of brushes 100 mounted on housing 12 in concentric relation with the brushes 80 by means of terminal assemblies 101, and a similar ring of brushes 102 is mounted on the housing plate 20 by means of terminal assemblies 103 for cooperative relation of these outer segmental rings and brushes are the same as already described for the other rings and brushes in connection with Figs. 5 and 6, and it will also be apparent that with these rings of contact segments and brushes having a greater diameter than the similar inner rings, there are more parts in each ring so that a correspondingly greater number of circuits can be handled thereby.

The invention accordingly provides a multiple slip ring joint which is of comparatively simple construction, involving as it does no complicated parts, and which makes possible the transmission of a great number of circuits between a stationary base and a rotary member through a joint unit of small and compact proportions. Thus, for example, with the unit constructed as shown in Figs. 1a and 1b, and incorporating two rows of brushes on both the base and rotary member, it is possible to mount as many as two hundred and fifty brushes in each pair of inner and outer rows while retaining the overall size of the base member 12 to a radius of about 12 inches and a height of about 6 inches. Incorporation of one or more additional rows of brushes will correspondingly multiply the total number of circuits which the unit can handle without increasing its overall diameter more than about 2 inches for each row.

The joint unit of the invention is especially useful for installations such as radar tracking units wherein there are not only a great number of comparatively low load circuits to be transferred between a stationary member and a rotary member, but also a substantial number of circuits of relatively greater load and including some high power circuits. Thus with the unit as shown in Figs. 1a and 1b, the segmental rings and their cooperating brushes can handle a correspondingly large number of low load circuits, and additional such circuits, as well as circuits requiring somewhat greater insulation, can be handled through the rings 35 and brushes 38. The high power or high pulse circuits, which require heavy insulation, can be transferred through the rings 45 and brushes 50. All of these circuits will be transferred continuously between the stationary member and the rotary member while the necessary requirement of shielding or insulation between the several circuits and their conducting parts are maintained at all times.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A multiple slip ring joint for transferring a large number of electric circuits between a stationary base and a rotary member, comprising two sets of contact elements mounted on said base in stationary relation with each other and in rotatable relation with both said base and said rotary member, said contact elements in each said set being arranged in angularly spaced relation to form a discontinuous ring, a plurality of brushes fixed in stationary relation on said base and in electric contact with the first set of said contact elements respectively, a plurality of brushes mounted on said rotary member in electric contact with the second said set of contact elements respectively and in rotatable relation therewith, means connecting successive said contact elements in said first set with separate successive said contact elements in said second set, and means for rotating said contact elements and said rotary member at different speeds with respect to each other and to said base such that a circuit between each stationary brush and the same associated rotating brush is maintained at all times by successive said connected pairs of contact elements in rotation.

2. A multiple slip ring joint for transferring a large number of electric circuits between a stationary base and a rotary member, comprising two sets of contact elements mounted on said base in stationary relation with each other and in rotatable relation with both said base and said rotary member, said contact elements in each said set being arranged in angularly spaced relation to form a discontinuous ring, a plurality of brushes fixed in stationary relation on said base and in electric contact with the first set of said contact elements respectively, a plurality of brushes mounted on said rotary member in electric contact with the second said set of contact elements respectively and in rotatable relation therewith, means connecting successive said contact elements in said first set with separate successive said contact elements in said second set, and means for rotating said contact elements and said rotary member in the same direction at a speed ratio of 1 to 2 respectively to cause a circuit between each stationary brush and the same associated rotating brush is maintained at all times by successive said connected pairs of contact elements in rotation.

3. A multiple slip ring joint for transferring a large number of electric circuits between a stationary base and a rotary member, comprising two sets of contact elements mounted on said base in stationary relation with each other and in rotatable relation with both said base and said rotary member, said contact elements in each said set being arranged in angularly spaced relation to form a discontinuous ring, a plurality of brushes fixed in stationary relation on said base and in electric contact with the first set of said contact elements respectively, a plurality of brushes mounted on said rotary member in electric contact with the second said set of contact elements respectively and in rotatable relation therewith, each contact element in said first set having a corresponding contact element in the other said set of the same angular dimensions and positioning in the opposite direction from a predetermined reference point in said first set, means connecting each said pair of corresponding contact elements with each other, and means for rotating said contact elements and said rotary member at different speeds with respect to each other and to said base such that each said stationary brush and the rotating said brush which is connected in the same circuit therewith are at all times maintained in circuit by successive said connected pairs of corresponding contact elements in rotation.

4. A multiple slip ring joint for transferring a large number of electric circuits between a stationary base and a rotary member, comprising two sets of contact elements mounted on said base in stationary relation with each other and in rotatable relation with both said base and said rotary member, said contact elements in each said set being arranged in angularly spaced relation to form a discontinuous ring, a plurality of brushes fixed in stationary relation on said base and in electric contact with the first set of said contact elements respectively, a plurality of brushes mounted on said rotary member in electric contact with the second said set of contact elements respectively and in rotatable relation therewith, each contact element in said first set having a corresponding contact element in the other said set of the same angular dimensions and positioning in the opposite direction from a predetermined reference point in said first set, means connecting each said pair of corresponding contact elements with each other, and means for rotating said contact elements and said rotary member at a speed ratio of 1 to 2 respectively to cause each said stationary brush and the rotating said brush which is connected in the same circuit therewith to be at all times maintained in circuit by successive said connected pairs of corresponding contact elements in rotation.

5. A multiple slip ring joint for transferring a large number of electric circuits between a stationary base and a rotary member, comprising two sets of contact elements mounted on said base in stationary relation with each other and in rotatable relation with both said base and said rotary member, said contact elements in each said set being arranged in angularly spaced relation to form a discontinuous ring, means connecting successive said contact elements in said first set with separate successive said contact elements in said second set, a plurality of brushes fixed in stationary relation on said base and in electric contact with the first set of said contact elements respectively, a plurality of brushes mounted on said rotary member in electric contact with the second said set of contact elements respectively and in rotatable relation therewith, each said rotating brush having a corresponding said stationary brush, and means for rotating said contact elements and said rotary member at different speeds with respect to each other and to said base such that each said rotating brush and the corresponding said stationary brush are at all times maintained in circuit by successive said pairs of connected said contact elements in rotation.

6. A multiple slip ring joint for transferring a large number of electric circuits between a stationary base and a rotary member, comprising two sets of contact elements mounted on said base in stationary relation with each other and in rotatable relation with both said base and said rotary member, said contact elements in each said set being arranged in angularly spaced relation to form a discontinuous ring, each contact element in said first set having a corresponding contact element in the other said set of the same angular dimensions and positioning in the opposite direction from a predetermined reference point in said first set, means connecting each said pair of corresponding contact elements with each other, a plurality of brushes fixed in stationary relation on said base and in electric contact with the first set of said contact elements respectively, a plurality of brushes mounted on said rotary member in electric contact with the second set of contact elements respectively and in rotatable relation therewith, each said rotating brush having a corresponding said stationary brush, and means for rotating said contact elements of said rotary member at a speed ratio of one to two respectively to cause each said rotating brush and its corresponding said stationary brush to be at all times maintained in circuit by successive said connected pairs of corresponding contact elements in rotation.

7. A multiple slip ring joint for transferring a large number of electric circuits between a stationary base and a rotary member, comprising a plurality of continuous contact rings mounted on said rotary member, means for connecting said rings with a corresponding plurality of circuits on said rotary member, two sets of contact elements mounted on said base in stationary relation with each other and in rotatable relation with said base and said rotary member, said contact elements in each said set being arranged in angularly spaced relation to form a discontinuous ring coaxial with and of greater diameter than said contact rings, a plurality of brushes fixed in stationary relation on said base and in electric contact with the first set of said contact elements respectively, a plurality of brushes mounted on said rotary member in electric contact with the second said set of contact elements respectively and in rotatable relation therewith, means for connecting said rotatable brushes with a corresponding additional plurality of circuits on said rotary member, means connecting successive said contact elements in said first set with separate successive said contact elements in said second set, means for rotating said contact elements and said rotary member at different speeds with respect to each other and to said base such that at all times a circuit between each stationary brush and the same associated rotating brush is maintained by successive said connected pairs of contact elements in rotation, and an additional plurality of stationary brushes mounted on said base in electric contact with said rings for completing said circuits on said rotary member connected with said continuous rings.

8. A multiple slip ring joint for transferring a large number of electric circuits between a stationary base and a rotary member, comprising two sets of contact elements mounted on said base in stationary relation with each other and in rotatable relation with both said base and said rotary member, said contact elements in each said set being arranged in angularly spaced relation to form a discontinuous ring, a plurality of brushes fixed in stationary relation on said base and in electric contact with the first set of said contact elements respectively, a plurality of brushes mounted on said rotary member in electric contact with the second said set of contact elements respectively and in rotatable relation therewith, means connecting successive said contact elements in said first set with separate successive said contact elements in said second set, means for rotating said contact elements and said rotary member at different speeds with respect to each other and to said base such that at all times a circuit between each stationary brush and the same associated rotating brush is maintained by successive said connected pairs of contact elements in rotation, and means supporting said contact elements in each said set in radially spaced relation beyond the periphery of said supporting means to provide space below the gap between each adjacent pair of said contact elements for receiving metallic particles produced by engagement of said brushes and said contact elements.

9. A multiple slip ring joint for transferring a large number of electric circuits between a stationary base and a rotary member, comprising two sets of contact elements mounted on said base in stationary relation with each other and in rotatable relation with both said base and said rotary member, said contact elements in each said set being arranged in angularly spaced relation to form a discontinuous ring, a plurality of brushes fixed in stationary relation on said base and in electric contact with the first set of said contact elements respectively, a plurality of brushes mounted on said rotary member in electric contact with the second said set of contact elements respectively and in rotatable relation therewith, each of said plurality of brushes having an angular length greater than the angular spacing between said contact elements with which they are in contact, each said plurality of brushes being angularly spaced a greater distance apart than said contact elements such that successive said brushes cannot bridge successive said contact elements at the same time, means connecting each successive said contact element in said first set with separate successive said contact elements in said second set, and means for rotating said contact elements in said rotary member at different speeds with respect to each other and to said base such that at all times a circuit between each stationary brush and the same associated rotating brush is maintained by successive said connected pairs of contact elements in rotation.

10. A multiple slip ring joint for transferring a large number of electric circuits between a stationary base and a rotary member, comprising two sets of contact elements mounted on said base in stationary relation with each other and in rotatable relation with both said base and said rotary member, said contact elements in each said set being arranged in angularly spaced relation to form a discontinuous ring, a plurality of brushes fixed in stationary relation on said base and in electric contact with the first set of said contact elements respectively, a plurality of brushes mounted on said rotary member in electric contact with the second said set of contact elements respectively and in rotatable relation therewith, each of said plurality of brushes having an angular length greater than the angular spacing between said contact elements with which they are in contact, each said plurality of brushes being angularly spaced a greater distance apart than said contact elements such that successive said brushes cannot bridge successive said contact elements at the same time, means connecting each successive said contact element in said first set with separate successive said contact elements in said second set, and means for rotating said contact elements and said rotary member in the same direction at a speed ratio of 1 to 2 respectively such that at all times a circuit between each stationary brush and the same associated rotating brush is maintained by successive said connected pairs of contact elements in rotation.

References Cited in the file of this patent

UNITED STATES PATENTS

| | | |
|---|---|---|
| 1,563,753 | Krone | Dec. 1, 1925 |
| 2,321,805 | Fritzinger | June 15, 1943 |